United States Patent [19]

Kohno et al.

[11] Patent Number: 4,673,220

[45] Date of Patent: Jun. 16, 1987

[54] BRAKE PRESSURE CONTROL VALVE ASSEMBLY HAVING A BYPASS FUNCTION

[75] Inventors: Teruhisa Kohno; Seiji Nokubo; Akio Matsuoka, all of Itami, Japan

[73] Assignee: Sumitomo Electric Industries, Ltd., Osaka, Japan

[21] Appl. No.: 777,625

[22] Filed: Sep. 19, 1985

[30] Foreign Application Priority Data

Oct. 17, 1984 [JP] Japan .................................. 59-218945
Dec. 21, 1984 [JP] Japan .................................. 59-194871[U]
Dec. 21, 1984 [JP] Japan .................................. 59-194872[U]

[51] Int. Cl.⁴ .............................................. B60T 8/26
[52] U.S. Cl. .................................... 303/6 C; 303/84 A
[58] Field of Search ................... 303/6 C, 6 R, 84 A, 303/84 R

[56] References Cited

U.S. PATENT DOCUMENTS

| 3,841,711 | 10/1974 | Stelzer | 303/84 A X |
| 4,004,839 | 1/1977 | Burgdorf | 303/84 A X |
| 4,027,923 | 6/1977 | Saito | 303/84 A X |
| 4,311,345 | 1/1982 | Schopper | 303/84 A |
| 4,322,114 | 3/1982 | Maehaera | 303/84 A |

Primary Examiner—Duane A. Reger
Attorney, Agent, or Firm—Ernest A. Beutler

[57] ABSTRACT

Improved brake pressure control valve assemblies with a bypass function are proposed which have an axially slidable piston responsive to fluid pressures of two brake fluid circuits, and a pressure reducing valve mounted in the piston for reducing the pressure of one of the two brake fluid circuits. If one of the circuits fails, the piston is adapted to move toward the failed circuit to disable the pressure reducing valve from reducing the pressure of the other of the two circuits.

15 Claims, 11 Drawing Figures

BRAKE PRESSURE CONTROL VALVE ASSEMBLY HAVING A BYPASS FUNCTION

The present invention relates to a brake pressure control valve assembly having a bypass function for use in a dual line brake fluid circuit in motor vehicles. This type of control valve assembly is used to bring the distribution of brake fluid pressure to the front and rear brakes to an ideal state, by reducing the pressure in at least one of the lines if both of the lines work normally, and by stopping the pressure reducing function in the live circuit if one of the circuits fails.

It is customary to divide the brake fluid circuit into two lines for greater safety. Typical circuits of this type include the II circuit in which the circuit is divided into the front wheel line and the rear wheel line, and the X circuit which is called the diagonal circuit, etc. In either of the circuits, a proportioning valve is used to reduce the rear brake pressure in comparison with the front brake pressure for ideal distribution of brake pressure into front and rear brakes. It is also customary to arrange the circuit so that if one circuit should fail, the proportioning valve in the live circuit will be disabled not to reduce the fluid pressure to secure the brake force.

On the other hand, in order to reduce the work for deairing the brake line during the assembly and to prevent air from remaining in the brake line, what is called the vacuum packing is usually adopted in which the brake fluid is packed after the brake pipeline from the reserve tank of the master cylinder has been evacuated. In the vacuum packing, extra time is required for evacuation if the brake fluid remains in the components in the brake line. Therefore, it is desired that no brake fluid remains in any of the components in the brake line. Thus, a master cylinder is tested for leakage with low air pressure for quality assurance whereas proportioning valves are usually tested with high-pressure brake fluid and supplied to automobile manufacturers after the brake fluid used for testing has been evacuated.

On the other hand, in order to reduce the work for mounting the proportioning valve and the piping work, it is customary to mount the proportioning valve in the master cylinder. If this method is adopted, it is rather difficult to test the master cylinder and the proportioning valve with different working fluids. Therefore, it is customary to mount the components of the proportioning valve in a casing having one end in the form of a sleeve, rather than mounting them directly in the body of the master cylinder, mount the casing in another body for testing having an inlet and an inlet for fluid, test the proportioning valve for its pressure reducing performance by use of brake fluid, take the proportioning valve out of the body, discharge the brake fluid out of the valve, re-mount the proportioning valve (in the casing) in the body of the master cylinder, test the entire master cylinder with low-pressure air, and supply the master cylinder and the proportioning valve to an automobile manufacturer. In this case, too, a means for disabling the proportioning valve in the live circuit if one circuit should fail, is needed, of course. Such a means has to be mounted in the abovesaid casing together with the components of the proportioning valve. To meet this requirement, the parts have to be small in size and become complicated in structure. Also, this decreases the reliability and ease of mounting.

An object of the present invention is to provide a brake pressure control valve assembly which obviates the abovesaid problems.

In accordance with the present invention, the abovesaid casing used for convenience of quality testing is employed to disable the proportioning valve in the live circuit if one circuit should fail, with the proportioning valve itself not having any disabling performance. This makes it possible to reduce the number of parts, reduce the manufacturing cost, increase the reliability and ease of mounting, and detect the failure in the piping.

In accordance with one embodiment of the present invention, the abovesaid casing is an axially slidable piston responsive to fluid pressures of two circuits applied from opposite directions. In a normal state where the pressures of two circuits are substantially equal to each other, the piston remains at a neutral position where the pressure reducing valve works to reduce the pressure of one circuit. If one of the circuits fails, the piston will move toward the circuit that failed, so that a bypass will be formed to connect the input side with the output side, disabling the pressure reducing valve.

In accordance with another embodiment of the present invention, the abovesaid casing is an axially slidable piston responsive to fluid pressures of two circuits applied from opposite directions. In a normal state where the pressures of two circuits are substantially equal to each other, the piston remains at a mounted position where a lip seal type pressure reducing valve works to reduce the pressure of one circuit. If one of the circuits including front brakes fails, the piston will move toward the circuit that failed, whereas the plunger of the pressure reducing valve remains at its inoperative position with the head of the plunger getting into the lip seal, so that a bypass will be formed in the plunger head to connect the inlet of the live circuit with its outlet, disabling the pressure reducing valve.

In accordance with a further embodiment of the present invention, the abovesaid casing is an axially slidable piston responsive to fluid pressures of two circuits applied from opposite directions. In a normal state where the pressures of two circuits are substantially equal to each other, the piston remains at the mounted position where the pressure reducing valve works to reduce the pressure of one circuit. If one circuit including the front brakes fails, the piston will move toward the circuit that failed, but since the distance for which the plunger of the pressure reducing valve can move is set to be smaller than the distance required for the plunger to butt the lip seal, the pressure reducing valve is disabled from reducing the pressure.

Other objects and features of the present invention will become apparent from the following description taken with reference to the accompanying drawings, in which.

In the drawing, like reference numerals are used for like or corresponding parts through various embodiments.

Figure 1:
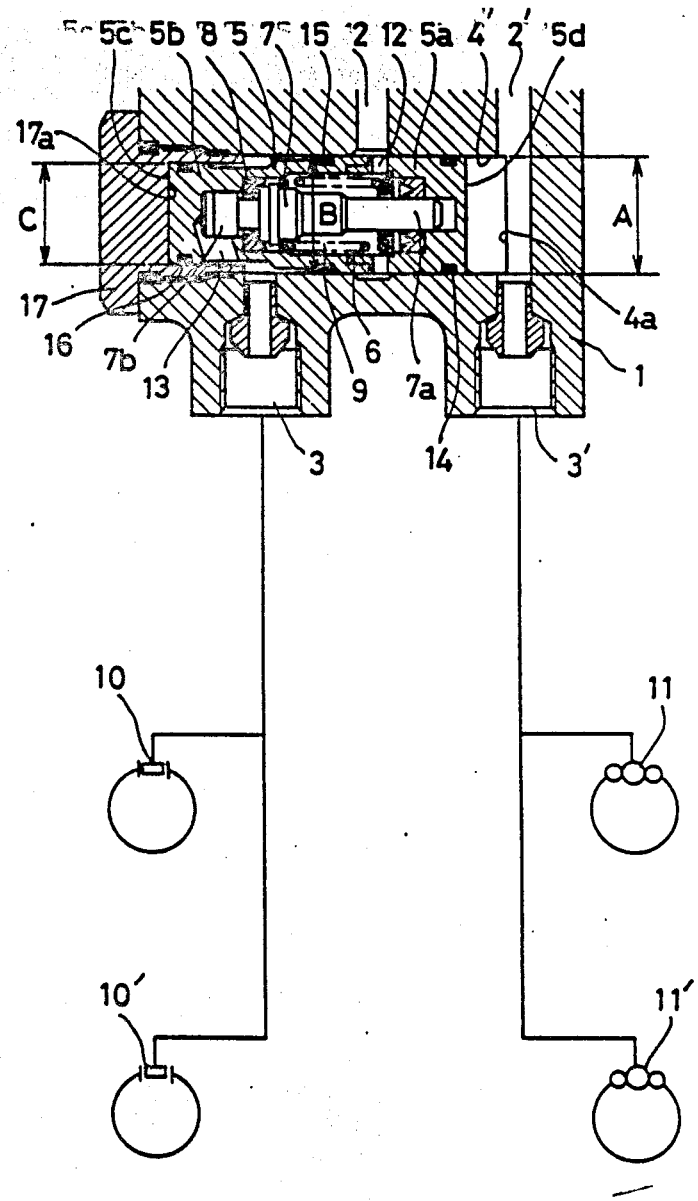
FIG. 1 is a sectional view of the first embodiment.

Referring to FIG. 1 showing the first embodiment, the pressure reducing valve assembly comprises a body 1 having inlets 2 and 2' for fluid fed from a master cylinder, these inlets communicating with each other through a bore 4. Two piston members 5a and 5b forming a piston 5 are pressed into the bore 4 so as to be axially slidable therein.

The piston 5 accommodates a known proportioning valve 9 of a lip seal type having a plunger 7 urged in a valve-opening direction by a spring 6 which determines the reduction starting pressure. The plunger 7 has a reduced portion 7a projecting fluid-tightly into the air and an enlarged portion 7b adapted to engage a lip seal 8.

Pressurized fluid fed from the inlet 2 through a passage 12 is pressure-reduced by the proportioning valve 9, passes through a passage 13 and an outlet 3, and is led to brakes 10, 10' for the rear wheels. This is the first line. On the other hand, fluid fed from the inlet 2' is led through an outlet 3' directly to brakes 11, 11' for the front wheels without being pressure-reduced. This is the second line.

An O-ring 14 mounted on the piston seals the fluid in one line from the fluid in the other line. The input pressure of the second line acts on the righthand end of the piston 5 having a sectional area A to urge the piston toward the first line. Mounted on the piston, an O-ring 15 seals the inlet side of the first line from its outlet side, having a sectional area B. An O-ring 16 is provided near the lefthand end of the piston which has a sectional area C and is open to the air.

Since $A = B > C$, the force urging the piston 5 toward the second line is only the output pressure of the first line acting on the sectional area B-C. Since the force urging the piston 5 toward the first line, which is the input pressure of the second line acting on the sectional area A, is always larger than the force urging the piston toward the second line, the piston 5 is kept in a position shown in FIG. 1 with its lefthand end 5c butting the bottom 17a of a plug 17, if both of the lines operate normally.

Figure 2:
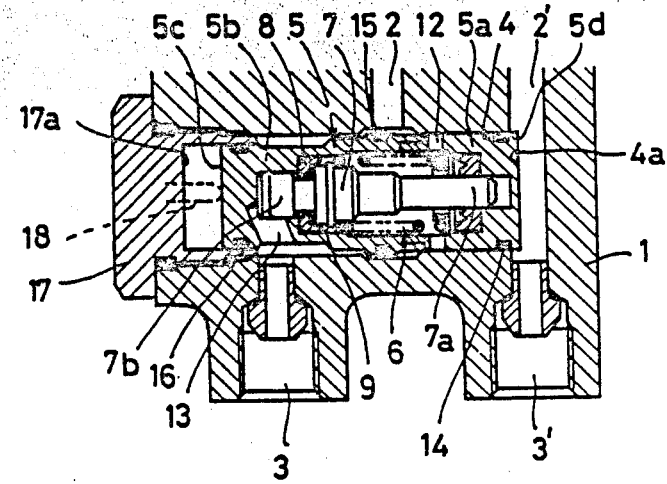
FIG. 2 is a sectional view of the same when there is some failure in the second circuit.

Should the second line including the brakes 11, 11' for the front wheels fail, the force urging the piston toward the first line will disappear so that the piston 5 will move toward the second line until it butts the bottom 4a of the bore 4 as shown in FIG. 2. The O-ring 15 will move with the piston toward the second line to such a position as shown in FIG. 2 where it does not seal the outlet 3 of the first line from its inlet 2. Now, a bypass connecting the outlet with the inlet is formed around the piston so that the same pressure as the inlet pressure will be applied to the outlet.

While the second line is failing, the piston will be kept at the position shown in FIG. 2 even after the pressure in the first line has been removed. The piston will go back to the position shown in FIG. 1 upon the first pressurization after the second line has been restored to its normal state. The failure state can be indicated for alarm by means of a terminal 18 (shown in FIG. 2 with a dotted line) of a reciprocating switch butting one end 5c of the piston 5.

Figure 3:
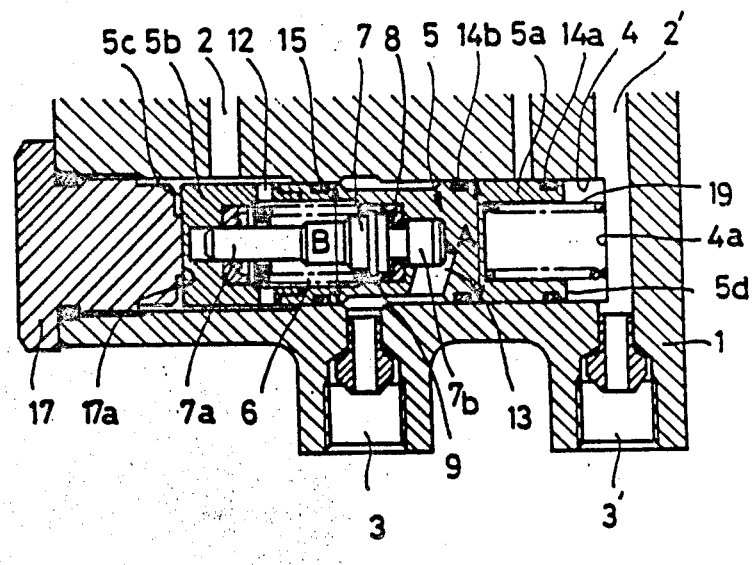
FIGS. 3–7 are sectional views of the second to sixth embodiments.

Referring to FIG. 3, the second embodiment differs from the first embodiment of FIG. 1 only in that following points. Firstly, between the inlet 2 of the first line and the inlet 2' of the second line there is the outlet 3 of the first line (thus the proportioning valve 9 faces in an opposite direction to the one in the first embodiment). Secondly, two O-rings 14a, 14b are provided to seal between the first line and the second line and there is an air chamber between these two O-rings so as to communicate with the outside. Thirdly, there is no O-ring at the lefthand end of the piston 5, which does not project into the air. Fourthly, an offset spring 19 is provided to urge the piston toward the first line.

The sectional areas A and B are equal to each other. Thus, the input pressures of both lines act on the equal sectional area. So, in a normal state, the piston 5 is kept in the position shown in FIG. 3 with its lefthand end kept butting the inner end 17a of the plug 17 only by the force of the offset spring 19. An O-ring 15 seals between the inlet side and the outlet side of the first line. The fluid fed from the inlet 2 of the first line passes through the passage 12, is pressure-reduced by the proportioning valve 9, and is fed through the passage 13 and the outlet 3 to the rear brakes.

If the second line including the front wheel brakes should fail, only the pressure of the first line acts on the sectional area A. The force of the offset spring 19 is set so that the piston 5 will move toward the second line before the proportioning valve 9 starts the pressure reduction. As in the first embodiment, a bypass is formed around the O-ring 15 to connect the inlet 2 of the first line with its outlet 3 before the start of the pressure reduction. Thus, the output pressure equal to the inlet pressure is supplied through the outlet 3 to the rear brakes. Unlike in the first embodiment, when the pressure of the first line is removed after failure of the second line, the piston 5 will return to the position of FIG. 3 under the bias of the offset spring 19. Until the failure is repaired, the piston will move toward the second line each time the pressure is applied to the first line.

Figure 4:
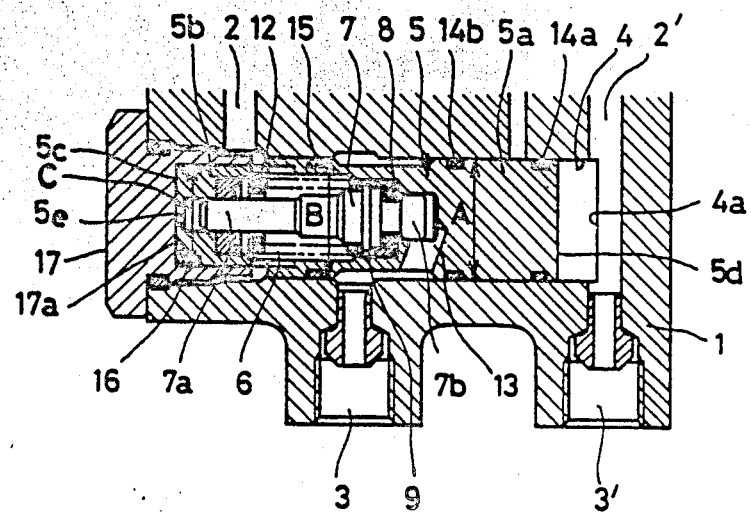

The third embodiment shown in FIG. 4 is the same as the second embodiment of FIG. 3 except in the following points. Firstly, no offset spring is provided. Secondly, as in the first embodiment, the lefthand end of the piston 5 is open to the air with an O-ring 16 having a sectional area C ($< A = B$). Thus, in a normal state, the piston 5 is at a position shown in FIG. 4. If the second line including the inlet 2' and the outlet 3' should fail, the piston will move to the right and be kept with its righthand end 5d butting the bottom 4a of the bore 4. It will return to its normal position at the first pressurization after the second line has been restored to its normal state.

A hole 5e at the lefthand end of the piston 5 connects the space formed between one end 5c of the piston 5 and the bottom 17a of the plug 17 with a chamber formed at the lefthand end of the reduced portion 7a of the plunger 7. This hole 5e is provided to increase the volume of the chamber and thus to prevent the pressure in the chamber from excessively increasing when assembling and to increase the ease of assembling and to avoid excessive decrease in the pressure of the air chamber during the movement of piston toward the second line and thus to make smoother the movement of piston.

The sectional area A may not be equal to the sectional area B, but may be smaller than B ($B > A > C$). By making A smaller than B, the amount of fluid required for the movement of piston upon the failure of second line can be decreased.

Figure 5:
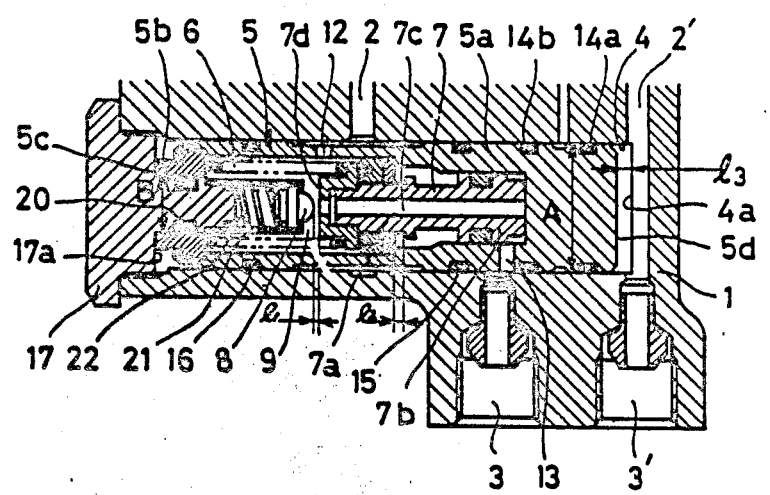

The fourth embodiment shown in FIG. 5 comprises a piston 5 formed by caulking two members 5a, 5b together, and a conventional poppet type pressure reducing valve 9 having an axially slidable plunger 7 and a poppet valve seat 8 urged by a poppet spring 22 so as to butt one end of a valve holder 21. The plunger 7 is biased by a spring 6 in a valve-opening direction and has a small-diameter portion 7a and a large-diameter portion 7b, both being sealed liquid-tight, a passage 7c axially extending through the plunger, and a valve rod 7d formed on one end of the small-diameter portion 7a.

Because the valve holder 21 is secured to a plug 17 bolted to the body 1, the poppet valve seat 8 cannot move to the right from the position shown in FIG. 5. O-rings 14a, 14b seal the pressure through the inlet 2 for the first line from the pressure through the inlet 2' for the second line, whereas the O-ring 15 seals between the inlet side and the outlet side of the second line. Also, O-rings 16 and 20 seal the lefthand end of the piston 5 which is open to the air.

All of the sectional areas A at the O-rings 14a, 14b, 15, 16 are equal to each other and the sectional area B at the O-ring 20 is smaller than A. In a normal state in which the input pressures of two lines are substantially equal to each other, the input pressure of the second line acts on the sectional area (A - B) to bias the piston 5 leftwardly, so that the piston will be kept in a position shown in FIG. 5. The distance $l_2$ is set to be larger than the distance $l_1$. Thus, the fluid pressure of the first line from the inlet 2 passes through the passage 12, is reduced by the pressure-reducing valve 9, and is supplied through the passage 13 and the outlet 3 to the rear brakes. To the front wheel brakes, the input pressure of the second line from the inlet 2' is directly supplied through the outlet 3' without being reduced.

If the second line including the front wheel brakes fails, the input pressure of the first line acts on the piston at the sectional area B, so that the piston will move to the right by a distance $l_3$ until its righthand end 5d butts the bottom 4a of the bore 4. Since the poppet valve seat 8 remains in the position shown in FIG. 5, the plunger 7 has to move by a distance $(l_1+l_3)$ to cause the valve rod 7d of plunger 7 to butt the valve seat 8. The plunger 7 can move by a distance $l_2$. If the distance $(l_1+l_3)$ is set to be larger than $l_2$, the valve rod 7d will not butt the valve seat 8 so that the passage 7c extending through the plunger 7 will form a bypass connecting the inlet 2 directly with the outlet 3. As a result, the input pressure of the first line is directly supplied to the rear wheel brakes. In this embodiment, too, the piston which has moved toward the failed line will return to the normal position only after the first pressurization after the second line has been repaired to its normal state.

Figure 6:
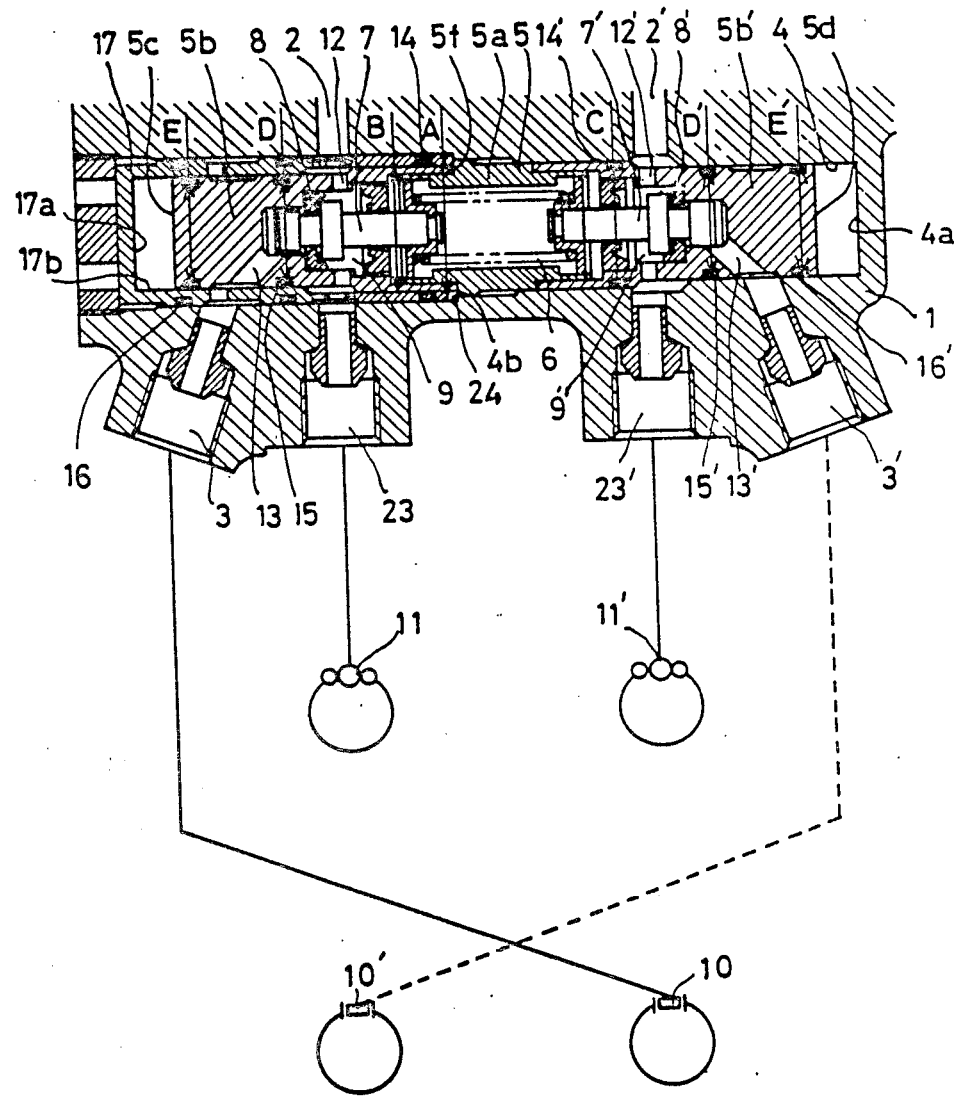

The fifth embodiment shown in FIG. 6 is adapted for use with the diagonal split system. It comprises a body 1 formed with a bore 4 through which the inlet 2 for the first line communicates with the inlet 2' for the second line, both inlets receiving the fluid from a master cylinder, and a piston 5 which is axially slidable and is formed by pressing together three members 5a, 5b, 5b' into the bore 4. The piston 5 incorporates an opposed pair of known lip seal type proportioning valves 9, 9' each of which comprises a lip seal 8 (8') and a plunger 7 (7') urged in a valve-opening direction by a spring 6 which determines the reduction starting pressure.

The fluids for the first and second lines fed through the inlets 2, 2' pass through the passages 12, 12', are reduced by the proportioning valves 9, 9', pass through the passages 13, 13' and the outlets 3, 3', and are led to the rear wheel brakes 10, 10', respectively. On the other hand, the fluids through the inlets 2, 2' are led to the front wheel brakes 11, 11' through outlets 23, 23' without any pressure reduction.

O-rings 14, 14' around the piston 5 seal between each line and an air chamber formed between the two lines whereas O-rings 15, 15' seal between the input pressure and the output pressure of each line when the piston 5 is in position shown in FIG. 6. Both ends of the piston are open to the air, sealed liquid-tight by O-ring 16, 16'. A sleeve 24 is slidably mounted on the piston 5 at the position of the O-ring 14 and is slidable in the bore 4. The righthand end of the sleeve 24 butts a shoulder 5f on the piston 5 and a shoulder 4b on the bore 4. The sectional areas at the O-rings 14, 14', 15, 15', 16 and 16' are set to $A>C>B>D=D'=E=E'$, wherein A is the sectional area at the outer diameter of O-ring 14, B at its inner diameter, C at the outer diameter of O-ring 14', D, D' at the outer diameters of O-rings 15, 15', and E, E' at the outer diameter of O-rings 16, 16'. Thus, in a normal state in which the input pressures for two lines through the inlets 2, 2' are substantially equal to each other, the fluid pressure for the first line acts on the sectional area (B−D) whereas the fluid pressure for the second line acts on the sectional area (C−D'). Since $C>B>D=D'$, the piston 5 is urged leftwardly. However, the input pressure of the first line acts on the sectional area (A−B) through the sleeve 24 and the shoulder 5f. Since $A>C$, the piston 5 will be urged rightwardly, so that it will maintain its neutral position shown in FIG. 6 with its righthand end butting the shoulder 4b on the bore 4.

If the second line at the right should fail, the leftward bias acting on the sectional area (C−D') will disappear and the rightward bias acting on the sectional area (B−D) will move the piston 5 until its righthand end 5d butts the bottom 4a of the bore 4. At the time, the O-ring 15 will pass through a guide hole 17b in a plug 17 so that a bypass connecting the inlet 2 with the outlet 3 is formed. Thus, the input pressure from the inlet 2 will be supplied through the outlet 3 to the rear wheel brakes 10 without any pressure reduction. The sleeve 24 is kept in position shown in FIG. 6 with its righthand end away from the shoulder 5f on the piston 5. After movement toward the second line, the piston will remain at the new position because of absence of any force returning it to its original position. After repair of the second line, the piston will return automatically to its neutral position upon the first pressurization of an equal pressure to two lines.

If the first line at the lefthand side should fail, the input pressure of the second line acting on the sectional area (C−D') will move the piston 5 leftwardly until its lefthand end 5c butts the bottom 17a of the plug 17. At this time, the O-ring 15' will get through a guide hole in the bore 4, so that a bypass connecting the inlet 2' of second line with its outlet 3' will be formed. The sleeve 24 will move leftwardly with the piston 5 with its righthand end butting the shoulder 5f on the piston 5. The piston will return to its neutral position shown in FIG. 6 only after the first pressurization after the first line has been repaired.

In the fifth embodiment, poppet type pressure reducing valves or other types may be used in place of lip seal type valves. If the poppet type valves are used, the principle of the fourth embodiment may be easily applied to the diagonal split system by securing the poppet valve seats in two lines to the body.

Figure 7:
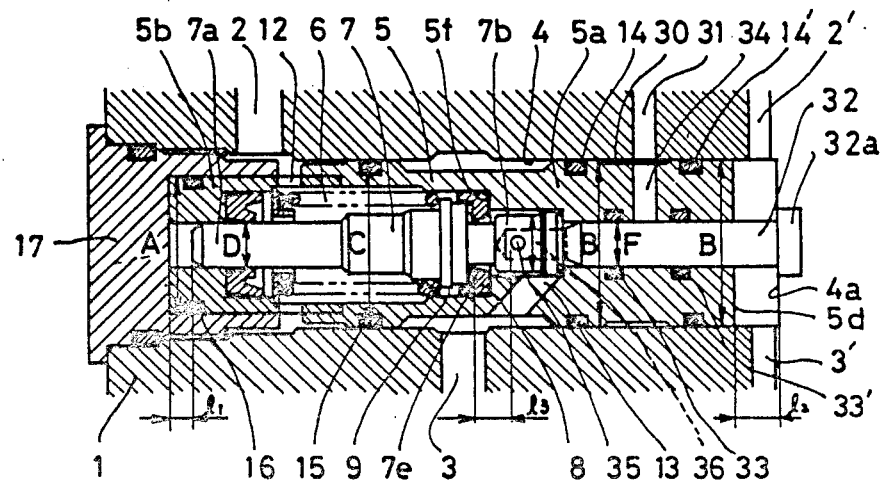

The sixth embodiment shown in FIG. 7 comprises a body 1 having inlets 2 and 2' for fluid fed from a master cylinder, these inlets communicating with each other through a bore 4. Two piston members 5a and 5b forming a piston 5 are pressed into the bore 4 so as to be axially slidable therein.

The piston 5 accommodates a known proportioning valve 9 of a lip seal type having a fluid-responsive plunger 7 urged in a valve-opening direction by a spring 6 which determines the reduction starting pressure. The plunger 7 has a reduced portion 7a (of a sectional area D) projecting fluid-tightly into the air and an enlarged portion 7b (of a sectional area E) adapted to engage a lip seal 8.

Pressurized fluid fed from the inlet 2 and through a passage 12 is pressure-reduced by the proportioning valve 9, passes through a passage 13 and an outlet 3, and is led to brakes (not shown) for the rear wheels. This is the first line. On the other hand, fluid fed from the inlet 2' is led through an outlet 3' directly to rear brakes (not shown) without being pressure-reduced. This is the second line.

O-rings 14, 14' seal the fluid in one line from the fluid in the other line with a sectional area B. An air chamber 30 is formed between the O-ring 14, 14' so as to communicate with a vent hole 31 connecting to the outside. The failure of the seal means can be recognized as fluid leakage. An O-ring 15 seals the inlet side of the first line from its outlet side with a sectional area C. An O-ring 16 seals the lefthand end of the piston 5 projecting into the air with a sectional area A. A pin 32 is inserted into the piston 5 from its righthand end. The pin has its head 32a pressed into a recess in a bottom 4a of the bore 4. O-ring 33, 33' on the pin 32 seal the second line from the first line with a sectional area F. A hole 34 disposed between the O-rings 33, 33' communicates with the air chamber 30. Thus, the failure of the seal members can be recognized as fluid leakage.

In a normal state in which the fluid pressures of two lines are substantially equal to each other, the force urging the piston 5 rightwardly is expressed as follows:

$$(P_M-P_R)(C-E)+P_R(B-F)-P_M(A-C)$$

wherein $P_M$ is the input pressure and $P_R$ is the output pressure.

Since the input pressure of the second line, too, is $P_M$, the force urging the piston leftwardly is:

$$P_M(B-F)$$

If the sectional areas are set so that the latter force will be larger than the former force, the piston 5 will be kept urged to the left as shown in FIG. 7, so that the input pressure of the first line will be always reduced and supplied.

Figure 8:
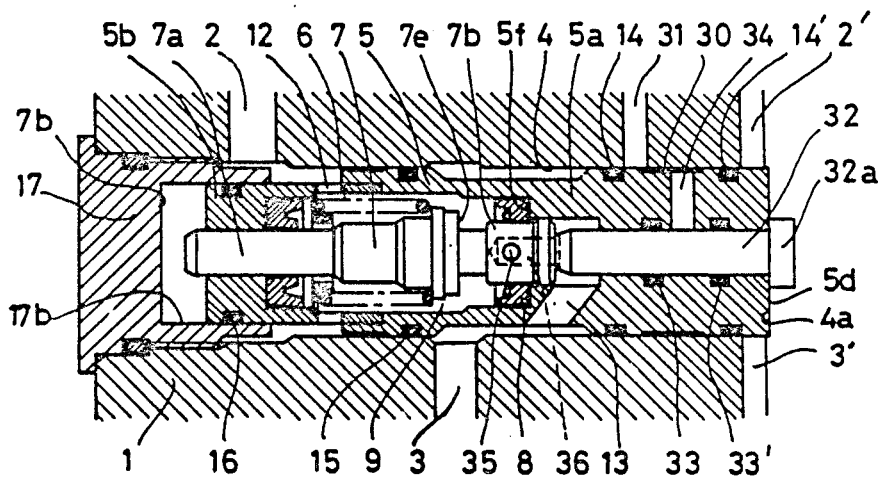
FIG. 8 is a sectional view of the sixth embodiment when there is some failure in the second circuit.

If the second line including the front wheel brakes fails, the force urging the piston 5 leftwardly will disappear. If the sectional areas are set so that (B-E)>(-A-D), the force urging the piston rightwardly, $P_M\{(B-E)-(A-D)\}$ will move the piston 5 to the right until its righthand end 5d butts the bottom 4a of the bore 4 as shown in FIG. 8. On the other hand, the plunger 7 will remain in position shown in FIG. 7 because it is prevented from rightward movement by the pin 32 which engages the head of the plunger at its lefthand end.

The lip seal 8 of the proportioning valve 9 is caught between the shoulder 5f on the piston 5 and the flange 7e on the plunger 7. As the piston moves rightwardly, the enlarged head 7b on the plunger 7 will engage the lip seal 8 to seal the output pressure from the input pressure. The input pressure acting on the sectional area $\{(B-E)-(A-D)\}$ will move the lip seal 8 rightwardly with the piston 5 until the head 7b on the plunger 7 gets deeply into the lip seal 8, as shown in FIG. 8.

Figure 9:
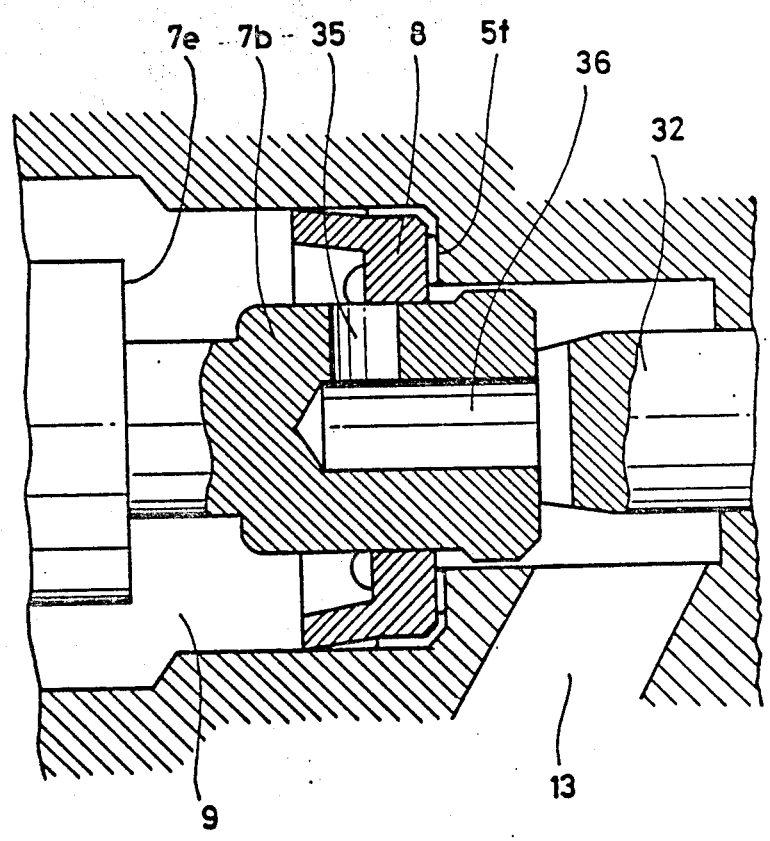
FIG. 9 is an enlarged view of a portion of FIG. 8.

As shown in FIG. 9, bypasses 35, 36 are formed on the head 7b on the plunger 7. In the state shown in FIG. 8 after rightward movement of the piston and the lip seal, the open outer end of the bypass 35 is disposed in the input chamber which is under the input pressure. Thus, the input chamber communicates with the output chamber through the by-passes 35, 36 so that the input pressure will be outputted without being reduced.

In a normal state, the bypasses 35, 36 are always disposed in the output chamber which is sealed from the input chamber by the lip seal 8 and is under the output pressure. With a proportioning valve of a lip seal type, it is well-known that in a normal state the head 7b on the plunger 7 gets in the lip seal 8, increasing the volume of the output chamber and thus decreasing the pressure in the closed circuit at the output side including the rear wheel brakes. The bypass 35 is provided in such a position as to meet the requirement:

$$l_1 < l_3 < l_2$$

wherein $l_1$ is the distance by which the plunger 7 moves; $l_2$ is the distance by which the piston moves to the right when the second line has failed; $l_3$ is the distance between the bypass 35 and the bottom of the lip seal 8 at its input side. (FIG. 7)

The piston 5 will remain at position shown in FIG. 8 until the second line is repaired, and will return to position in FIG. 7 upon the first pressurization after repair.

The bypass formed in the head of the plunger is not limited to the illustrated one, but may take any other form so long as it provides communication between the input side and the output side.

Figure 10:
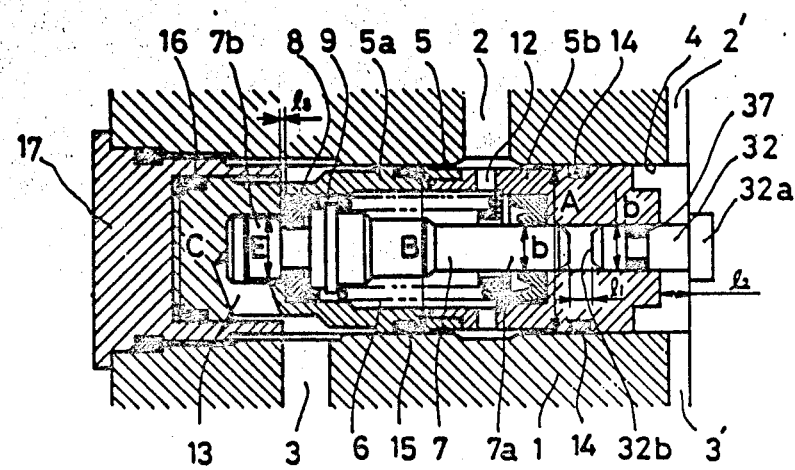
FIG. 10 is a sectional view of the seventh embodiment in a normal state.

The seventh embodiment shown in FIG. 10 comprises a body 1 having inlets 2 and 2' for fluid fed from a master cylinder, these inlets communicating with each other through a bore 4. Two piston members 5a and 5b forming a piston 5 are pressed into the bore 4 so as to be axially slidable therein.

The piston 5 accommodates a known proportioning valve 9 of a lip seal type having a fluid-responsive plunger 7 urged in a valve-opening direction by a spring 6 which determines the reduction starting pressure. The plunger 7 has a reduced portion 7a (of a sectional area D) projecting fluid-tightly into the air and an enlarged portion 7b (of a sectional area E) adapted to engage a lip seal 8.

Pressurized fluid fed from the inlet 2 and through a passage 12 is pressure-reduced by the proportioning valve 9, passes through a passage 13 and an outlet 3, and is led to brakes 10, 10' for the rear wheels. This is the first line. On the other hand, fluid fed from the inlet 2' is led through the outlet 3' directly to brakes 11, 11' for the rear brakes without being pressure-reduced. This is the second line.

An O-ring 14 seals the fluid in one line from the fluid in the other line with a sectional area A. The O-ring 15 seals between the input pressure and the output pressure of the first line with a sectional area B. With a sectional area C, the O-ring 16 seals the lefthand end of the piston 5 projecting into the air. A stopper pin 32 has its lefthand end inserted into the piston 5 and its righthand end 32a pressed into a recess formed in the body 1. The O-ring 37 seals the input pressure of the second line from an air chamber formed between the reduced end $7a$ on the plunger 7 and the lefthand end $32b$ of the pin 32.

In a normal state in which the input pressures of two lines are substantially equal to each other, the force urging the piston 5 rightwardly is expressed as follows:

$$P_M(A-D)-P_M(B-E)+P_R(B-E)-P_{R.C}=P_M\{(A-D)-(B-E)\}+P_R((B-E)-C)\ldots \quad (1)$$

wherein $P_R$ is the output pressure of the first line.

On the other hand, the force urging the piston leftwardly is:

$$P_M(A-D)\ldots \quad (2)$$

The force urging it leftwardly minus the force urging rightwardly is:

$$(P_M-P_R)(B-E)+P_{R.C.}>0\ldots \quad (3)$$

This means that the former is always larger than the latter, so that the piston 5 will be kept in position shown in FIG. 10.

Figure 11:
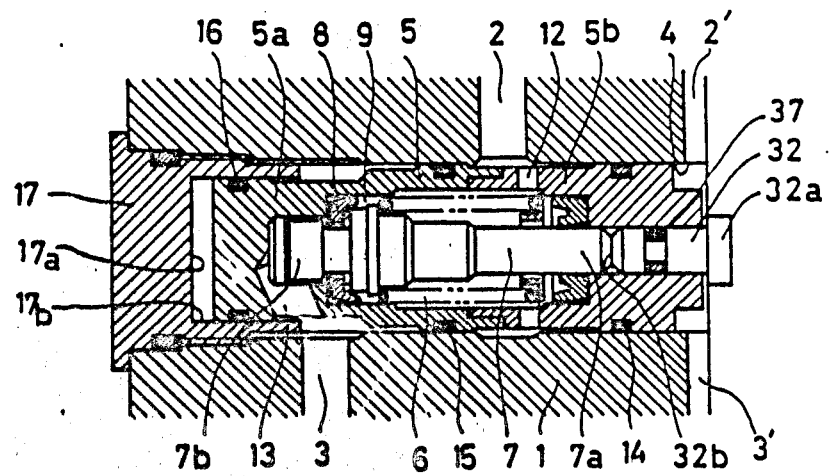
FIG. 11 is a sectional view of the same when there is some failure in the second circuit.

If the second line including the front wheel brakes should fail, the force urging the piston leftwardly will disappear, so that the piston 5 will move to the right with the plunger 7 and the lip seal 8 to position shown in FIG. 11. If the distances $l_1$ and $l_2$ shown in FIG. 10 are set to be $l_1<l_2$, the righthand end $7a$ on the plunger 7 will engage the lefthand end $32b$ of the stopper pin 32. In other words, the stopper pin will prevent the plunger 7 from moving toward and engaging the lip seal 8. Thus, the proportioning valve 9 will be kept open, so that the input pressure of the first line will be supplied without being reduced. It is not essential that $l_1<l_2$. If $l_1>l_2$ but $l_1>l_3$ (wherein $l_3$ is the distance required for the plunger 7 to butt the lip seal 8), the same result can be obtained because $(l_1-l_2)$ is the distance for which the plunger 7 can move after the righthand end of the piston 5 has butted the bottom of the bore 4.

The piston will remain in position shown in FIG. 11 until the second line is repaired and the pressure is applied to the second line, because of the absence of force urging the piston leftwardly. Upon the first pressurization after repair, the piston will return to its original position shown in FIG. 10. By detecting the movement of the piston by means of a switch terminal, the failure condition can be easily detected.

What we claim:

1. A brake pressure control valve assembly having a bypass function for use in a dual brake fluid circuit, said assembly comprising a body formed with a bore, a pair of inlets intersecting said bore and a pair of outlets intersecting said bore, a piston slidably mounted in said bore so as to be responsive to fluid pressures from two brake fluid circuits, a pressure reducing valve supported within said piston for reducing the pressure of one of said two brake fluid circuits, said piston being responsive to pressure differences between said circuits for movement toward said one circuit to disable said pressure reducing valve from reducing the pressure of the other of said two circuits.

2. A brake pressure control valve assembly having a bypass function for use in a dual brake fluid circuit, said assembly comprising a body formed with a bore, a pair of inlets and a pair of outlets, a piston sidably mounted in said bore so as to be responsive to fluid pressures from two brake fluid circuits, a pressure reducing valve mounted in said piston for reducing the pressure of one of said two brake fluid circuits, annular seal means mounted on said piston and adapted to seal the input side of said pressure reducing valve from the output side thereof when both of said circuits are normal, and if one of said circuits fails, said piston being adapted to move toward said one circuit to disable said pressure reducing valve from reducing the pressure of the other of said two circuits which remains live, by forming a bypass around said piston to connect said input side with said output side.

3. The brake pressure control valve assembly as claimed in claim 2, wherein said piston is adapted to return automatically to its normal position where said seal means work effectively, after said piston has moved toward said one circuit that failed.

4. The brake pressure control valve assembly as claimed in claim 1, wherein said pressure reducing valve comprises an axially slidable plunger and a fixed valve seat, said plunger having a small-diameter portion acted upon by an input pressure, a large-diameter portion acted upon by an output pressure, and a valve head, said valve head adapted to engage on and disengage off said fixed valve seat to close and open the communication between said output pressure and said input pressure, said plunger being adapted to move together with said piston toward said one defective circuit when one of said two circuits has failed, the distance for which said plunger can move in a valve-closing direction being smaller than the distance required for said valve head to butt said fixed valve seat, whereby disabling said pressure reducing valve from reducing the pressure of said other circuit that remains live.

5. The brake pressure control valve assembly as claimed in claim 1, wherein said pressure reducing valve comprises an axially slidable plunger and a fixed valve seat, said plunger having a large-diameter portion acted upon by the output pressure, a small-diameter portion projecting fluid-tight into air, a valve head, and a shoulder formed between said large-diameter portion and said small-diameter portion and acted upon by the input pressure from a direction opposite to said output pressure, said valve head adapted to engage on and disengage off said fixed valve seat to close and open the communication between said output pressure and said input pressure, said plunger and said fixed valve seat being adapted to move together with said piston toward said one defective circuit when one of said two circuits has failed, the distance for which said plunger can move in a valve-closing direction being smaller than the distance required for said valve head to butt said fixed valve seat, whereby disabling said pressure reducing valve from reducing the pressure of said other circuit that remains live.

6. The brake pressure control valve assembly as claimed in claim 1, wherein said pressure reducing valve comprises an axially slidable plunger and an annular lip seal, said plunger having a large-diameter portion acted upon by the output pressure, and a small-diameter portion projecting fluid-tight into the air, a shoulder formed between said large-diameter portion and said small-diameter portion and acted upon by the input pressure from a direction opposite to said output pressure, said lip seal being made of an elastic high polymeric material and mounted on said plunger so as to engage on and disengage from a portion of said large-diameter portion to close and open the communication between the input pressure and the output pressure, said piston being adapted to move together with said lip seal toward the defective circuit whereas said plunger remains at its original position, so that a bypass will be formed at said large-diameter portion of said plunger to give communication between the input pressure and the output pressure, whereby disabling said pressure reducing valve from reducing the pressure of the other circuit which is live.

7. The brake pressure control valve assembly as claimed in claim 1, wherein said piston is adapted to return automatically upon the first pressurization after said defective circuit has been repaired.

8. The brake pressure control valve assembly as claimed in claim 2, wherein said piston is adapted to return automatically upon the first pressurization after said defective circuit has been repaired.

9. The brake pressure control valve assembly as claimed in claim 4, wherein said piston is adapted to return automatically upon the first pressurization after said defective circuit has been repaired.

10. The brake pressure control valve assembly as claimed in claim 5, wherein said piston is adapted to return automatically upon the first pressurization after said defective circuit has been repaired.

11. The brake pressure control valve assembly as claimed in claim 6, wherein said piston is adapted to return automatically upon the first pressurization after said defective circuit has been repaired.

12. In a brake pressure control valve assembly having a bypass function for use in a dual brake fluid circuit, said assembly comprising a body formed with a bore, a pair of inlets and a pair outlets, a piston mounted in said bore, a pressure reducing valve mounted in said piston for reducing the pressure of one of two brake fluid circuits, said pressure reducing valve comprising an axially slidable plunger having a reduced portion acted upon by the pressure at said inlet and an enlarged portion acted upon by the pressure at said outlet, a valve means disposed in a passage connecting said inlet with said outlet and adapted to be opened and closed by the axial displacement of said plunger, and a spring means urging said plunger toward the side of said outlet to hold said valve means in its open position, the improvement consisting in that said piston is axially slidable in both directions in response to the fluid pressures from said two fluid circuits, and if one of said two circuits fails, said piston being adapted to move toward said one circuit to disable said pressure reducing valve from reducing the pressure of the other of said two circuits which remains live.

13. In a brake pressure control valve assembly as set forth in claim 12 wherein said pressure reducing valve comprises an axially slidable plunger and a fixed valve seat, said plunger having a valve head adapted to engage on and disengage off said fixed valve seat to close and open the communication between said output pressure and said input pressure, said plunger being adapted to move together with said piston toward said one defective circuit when one of said two circuits has failed, the distance for which said plunger can move in a valve-closing direction being smaller than the distance required for said valve head to butt said fixed valve seat, whereby disabling said pressure reducing valve from reducing the pressure of said other circuits that remains live.

14. In a brake pressure control valve assembly as set forth in claim 12 wherein said pressure reducing valve comprises an axially slidable plunger and a fixed valve seat, said plunger having a valve head, and a shoulder formed between said large-diameter portion and said small-diameter portion and acted upon by the input pressure from a direction opposite to said output pressure, said valve head adapted to engage on and disengage off said fixed valve seat to close and open the communication between said output pressure and said input pressure, said plunger and said fixed valve seat being adapted to move together with said piston toward said one defective circuit when one of said two circuits has failed, the distance for which said plunger can move in a valve-closing direction being smaller than the distance required for said valve head to butt said fixed valve seat, whereby disabling said pressure reducing valve from reducing the pressure of said other circuit that remains live.

15. In a brake pressure control valve assembly as set forth in claim 12 wherein said piston is adapted to return automatically upon the first pressurization after said defective circuit has been repaired.

* * * * *